United States Patent Office 3,217,825
Patented Nov. 16, 1965

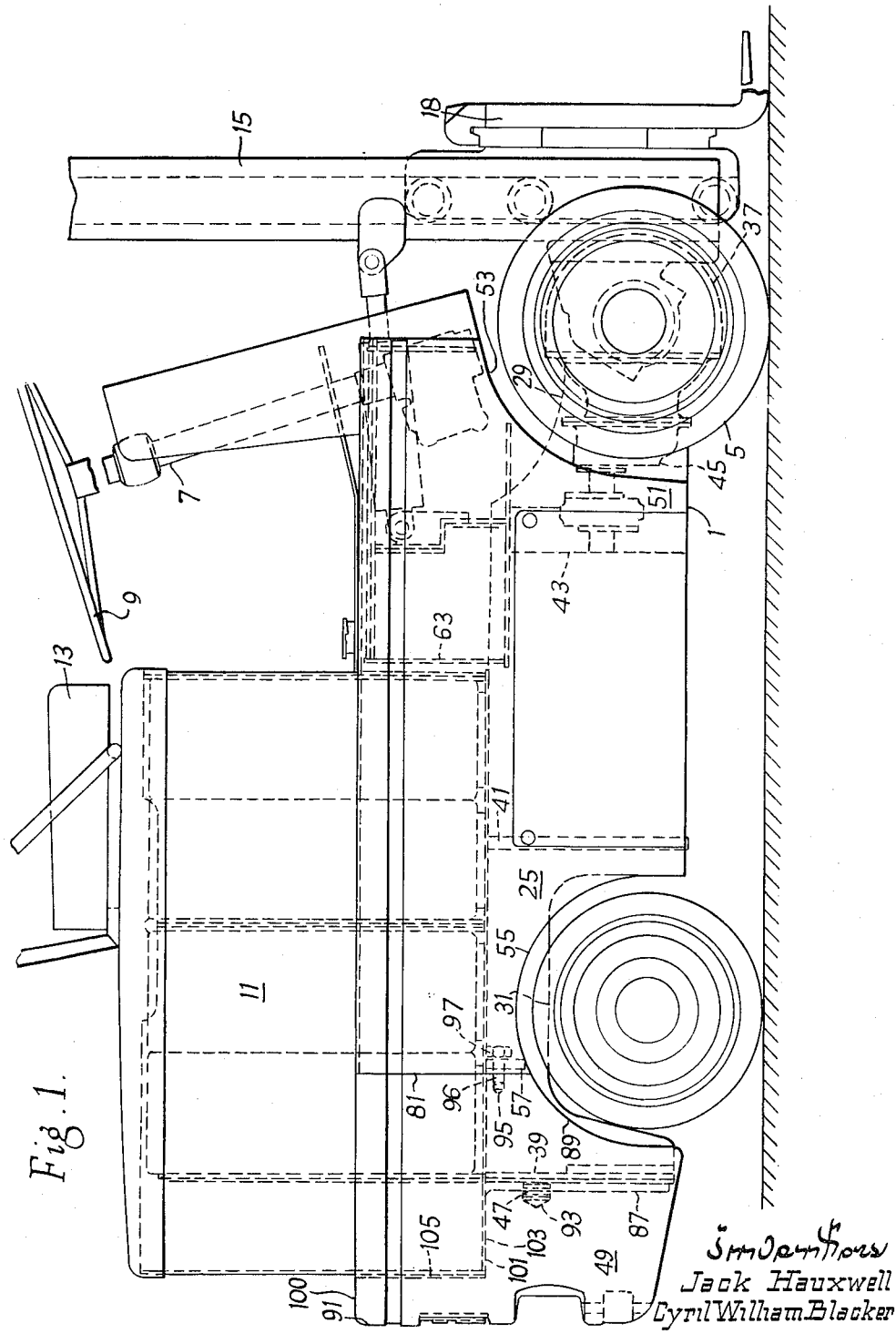

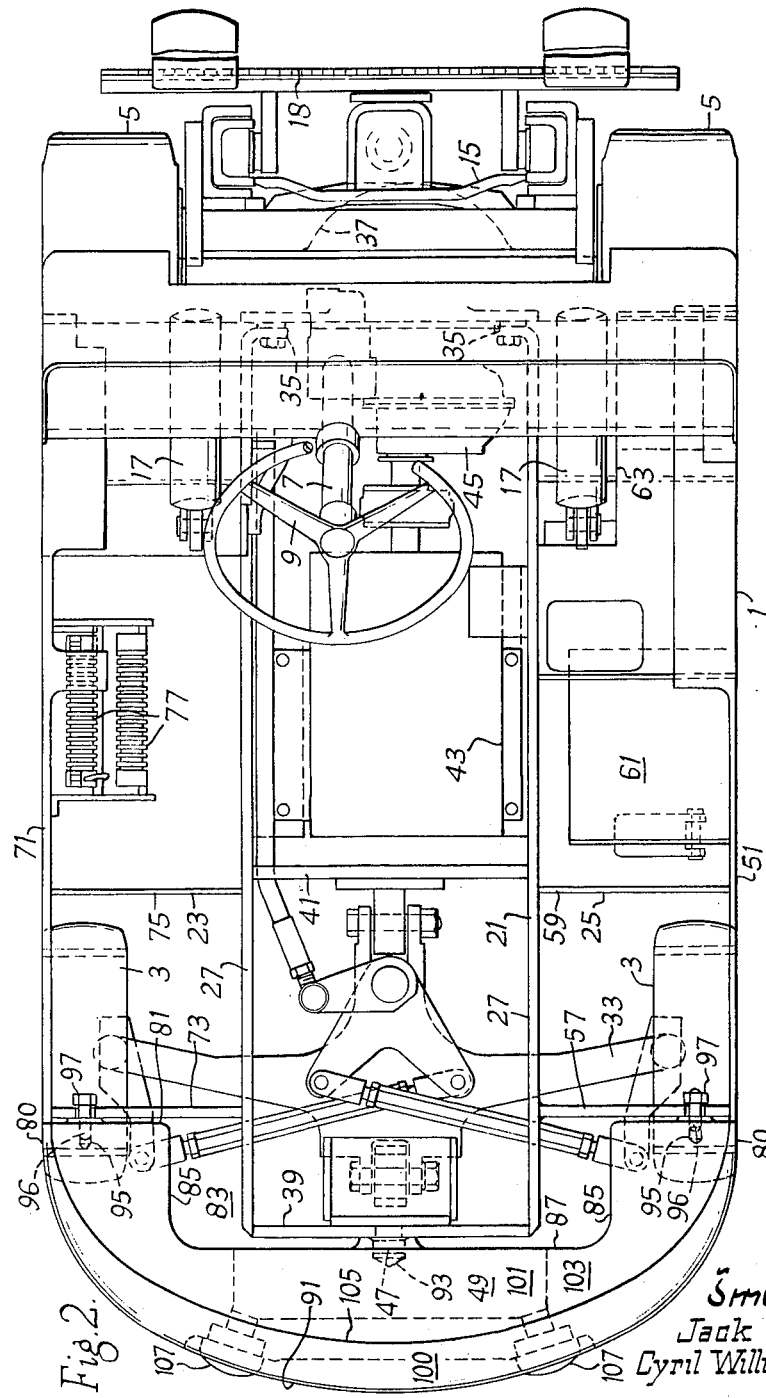

3,217,825
BATTERY ENCLOSING COUNTERWEIGHT FOR FORK LIFT TRUCKS
Jack Hauxwell and Cyril William Blacker, Ipswich, England, assignors to Ransomes Sims & Jefferies Limited, Ipswich, Suffolk, England
Filed June 25, 1963, Ser. No. 290,426
Claims priority, application Great Britain, June 26, 1962, 24,510/62
2 Claims. (Cl. 180—68.5)

This invention relates to masted fork lift trucks, that is to say trucks of the kind having an upright mast at a forward end thereof up and down which a carriage carrying the load bearing fork means is arranged to travel.

With such trucks it is common practice to provide on the chassis, usually at the rear end thereof, a ballast weight for counterbalancing the load on the fork means. The weight of the ballast is calculated on the basis of the maximum or pay load carried by the forks and the ballast weight is rigidly attached to the chassis. This means that the truck cannot then be adapted for use with a greater pay load. Also, if the truck is to be exported the ballast weight accounts for a significant part of the cost of transport by reason of its making the vehicle heavy and long.

According to the present invention, a masted fork lift truck having a chassis carried on ground engaging pairs of front and rear wheels is provided with a ballast weight formed in one piece and releasably secured to a rear end of the chassis so as to project rearwardly therefrom.

Suitably, the truck is battery driven and the ballast weight is formed at its rear end with an upstanding part which together with side members of the chassis and upper surfaces of chassis members between the side members thereof define a well within which a battery casing of the truck can be closely fitted.

Preferably, a central part of a rear end portion of the chassis projects rearwardly and includes a transverse plate on which the ballast weight is carried by means of a spigot and socket connection, the ballast weight including, at opposite sides of the central rearwardly projecting chassis part, respective forwardly extending portions each of which is connected to the chassis by a releasable connection.

The invention will now be described, by way of example, with reference to the accompanying drawings, in which:

FIGURE 1 is a side elevation of a battery operated, masted fork lift truck according to the invention, and FIGURE 2 is a plan view of the truck of FIGURE 1, the battery casing having been removed to clarify certain details of construction.

Referring to the drawings, a battery operated, masted fork-lift truck comprises a chassis, generally indicated at 1 and carried on pairs of ground engaging steering wheels 3 and driven wheels 5. The steering wheels are controlled in known manner from a steering column 7, to the rear of a handle 9 of which is provided, on a casing 11 of the battery, a seat 13 for the truck driver. At the forward end of the chassis 1 is mounted an extensible mast 15 which is tiltable about a horizontal transverse axis near the lower end thereof by a pair of double acting hydraulic rams 17.

A fork carriage 18 is provided which, in known manner, traverses the mast.

The chassis 1 of the truck comprises, as seen in plan view, three longitudinally extending portions, namely, a center frame portion 21, a left hand frame portion 23 and a right hand frame portion 25.

The center frame portion 21 includes two mutually spaced, longitudinally extending steel plates 27. Towards the forward end, the upper edge of each side plate extends first downwardly and then forwardly to provide a forward portion 29 of reduced depth whilst towards the rear end of each plate the lower edge thereof extends upwardly, rearwardly and downwardly to form an arch 31 for accommodating a rear axle assembly 33 of the vehicle. The forward upright ends of the side plates are inturned as at 35 to provide mountings for a casing 37 of the front axle assembly. The side plates are secured together by two spaced transversely extending steel plates of which a rear plate 39 is welded along its upright edges to the respective upright end edges of the side plates 27 whilst a further transverse partition plate 41 is disposed forwardly of the arches in the side plates and welded at its upright edges to the side plates. The cavity defined by the side plates 27 and the partition plate 41 and the front axle assembly 37 serves to accommodate an electric drive motor 43 of the vehicle which drives differential gears of the front axle assembly through reduction gears in casing 45.

Projecting rearwardly from the rear transverse plate 39 is a cylindrical spigot or stud 47 which serves as part of a mounting for a main ballast weight 49 which is readily removably mounted on the chassis as more fully described hereinafter.

The right hand frame portion 25 includes a steel outer side plate 51 the top edge of which is horizontal. The front edge of plate 51 extends downwardly and then is curved downwardly and rearwardly to provide an arch 53 for the right hand front drive wheel. From the rear end of the bottom edge of the outer side plate 51 extends upwardly and rearwardly an arcuate portion which serves as a rear wheel arch 55.

A short distance inwardly from the rear end of the outer side plate 51 is welded a rear, upright and inwardly projecting plate 57, an inner upright edge of which is welded to side plate 27 forwardly of rear transverse plate 39. The upper edge of plate 57 lies flush with the upper edges of the rear and side plates 39 and 27 of the central frame.

Forwardly of the rear wheel arch 55 in the outer side plate is welded an upright inwardly extending intermediate plate 59 the top edge of which is at the level of the top edge of the rear plate 57. In the cavity which extends forwardly of the intermediate plate 59 and between side plates 27 and 51 is disposed an hydraulic pump motor 61 constituting the prime mover whereby the inclination of the mast 15 and position of the fork bearing carriage 18 on the mast are controlled.

Above a forward part of the cavity in which the pump motor is housed is formed a tank reservoir 63 of welded construction for hydraulic fluid pumped by the pump motor.

The left hand frame portion 23 of the chassis is formed in a manner generally similar to the right hand frame portion with an outer side plate 71, an inwardly projecting rear plate 73 and an intermediate plate 75. Between the plate 27 and the plate 71 forwardly of the plate 75 is a cavity for housing electrical control gear such as a carbon pile regulator 77 for effecting speed control of the main drive motor 43.

The ballast weight 49 comprises a cast body of metal having upright sides 80 flush with the outer side plates 71 and 51 of the left and right hand frame portions. In a front upright face 81 of the ballast weight is formed a recess 83 having vertical side faces 85 spaced apart by a distance slightly greater than the overall dimension between the longitudinal side plates 27 of the central frame portion. A rear upright face 87 of the recess is spaced from the front upright face of the ballast weight by an amount slightly greater than the spacing between the rear transverse plates 39 and 57 and 73 of the central and side frame portions of the chassis. On either side of the recess 83 the front face 81 of the ballast weight is curved rearwardly and downwardly as at 89 to provide rear parts of the rear wheel arches of the vehicle. The rear upright face 91 of the ballast weight is curved in plan view and at its ends merges with the upright side faces 80.

In the rear wall of the recess in the front face of the ballast weight is formed a cylindrical socket or hole 93 into which extends the spigot or stud 47 on the rear plate 39 of the central frame portion of the chassis. When the spigot is engaged in its hole the recess in the front face of the ballast weight is disposed around the rear end part of the central frame portion of the chassis and the front face portions of the ballast weight on either side of the recess are disposed adjacent the respective rear transverse plates 73 and 57 of the left and right hand chassis frame portions. In the front face portions of the ballast weight on opposite sides of the recess are formed respective tapped holes 95 in which are engaged threaded bolts 96 which project forwardly through apertures in the rear transverse plates 73 and 57 of the left and right hand chassis frame portions. The forward ends of these bolts are engaged by nuts 97 whereby releasable securement of the ballast weight to the chassis is provided.

The upper face 100 of the ballast weight is formed with a recess 101 extending over a substantial area of that face. This recess has a flat bottom face 103 co-planar with upper edges of the chassis members 27, 39, 57 and 73 disposed between the outer side plates 51 and 71 of the chassis and an upright rear wall 105 which is curved and at its forward ends is flush with the inner surfaces of side plates 51 and 71. The height of the rear wall 105 of the recess 101 is such that its upper edge is at the level of the upper edges of the chassis outer side plates 51 and 71.

The recess 101 in the upper face of the ballast weight together with the extension thereof provided between the outer side plates 51 and 71 of the chassis afford a well within which the battery casing 11 of the vehicle is closely fitted.

It will be noted that the ballast weight is formed to accommodate the rear lights 107 of the vehicle, suitable channels (not shown) being provided in the ballast weight for electrical leads to the lights.

The size of the battery casing 11 is sufficient to accommodate a battery of the correct capacity for operating the truck when the latter is fitted with ballast weight 49. If the truck is adapted for use with a differing payload, by fitting another ballast weight which is of the same general shape as ballast weight 49, a further battery in a casing similar to casing 11 but adapted to the other ballast weight is employed.

To change the ballast weight 49 in order to adapt the truck for use with a different payload involves lifting the battery and its casing 11 out of the truck and then, after disconnecting the leads to rear lights 107, removing the nuts 97 from the bolts 96 and withdrawing the ballast weight rearwardly. The new ballast weight can then be secured to the chassis by mounting thereof on the spigot 47 and by replacing the nuts 97 on the bolts of the new ballast weight. The battery appropriate to the new ballast weight is then lowered into position.

It will be appreciated that the invention has important advantages as regards the cost of transporting the truck which depend upon the length and weight of the vehicle. If the ballast weight is removed, and supplied by local manufacture, at the site where the truck is to be used, the truck is rendered both shorter and lighter for transport purposes.

We claim:

1. In a masted fork lift truck having ground engaging front and rear wheels and a chassis carried on said wheels and having side and rear frame members, said side frame members being laterally spaced apart and extending lengthwise along opposite sides of the chassis and the rear frame member being connected to and spanning the side members at their rear ends:
    (A) a substantially U-shaped ballast weight for the truck having
        (1) a forwardly facing surface on its bight portion which is shaped in conformity to the rear surface of the rear frame member so as to be closely opposable to the same,
        (2) having an upwardly and forwardly opening recess in its bight portion, and
        (3) having arms which project a substantial distance forwardly of said surface and which are spaced apart laterally to embrace the rear end portions of the side frame members, said arms being of such length and size that the center of gravity of the ballast weight is located near said surface;
    (B) cooperating tongue and socket connection means on the bight portion of the ballast weight, between the arms, and on the rear frame member, between the side frame members, cooperable to support the ballast weight on the rear of the chassis with said surface on the bight portion of the ballast weight closely opposing the rear frame member, said connection means being engageable and disengageable by relative fore-and-aft motion between the ballast weight and the chassis;
    (C) cooperating readily releasable fastening means on the front portion of each arm of the ballast weight and on a part of the chassis adjacent thereto for securing the arm to the chassis, said fastening means at each side of the ballast weight cooperating with one another and with the tongue and socket connection means to secure the ballast weight to the chassis; and
    (D) a battery case supported by the frame members and disposed generally over the rear wheels of the truck and projecting rearwardly beyond said rear frame member with its lower rear portion received in and closely fitting said recess in the bight portion of the ballast weight.

2. The fork lift truck of claim 1 further characterized by the following:
    (A) said part of the chassis adjacent to the front portion of each arm comprises a frame member which projects laterally outwardly from the side member a distance ahead of the rear member and which supports a side wall portion of chassis; and
    (B) the outer surfaces of the arms of the ballast weight are shaped to provide rearward continuations of the outer surfaces of said side wall portions of the chassis.

References Cited by the Examiner
UNITED STATES PATENTS 2,256,314  9/1941  Dunham _____ 180—54
2,693,250  11/1954 Barrett.
2,969,991  1/1961  Ulinski _____ 280—150
3,061,034  10/1962 Hoyt _____ 180—68.5

FOREIGN PATENTS 304,578    3/1955  Switzerland.
1,068,861  7/1954  France.

A. HARRY LEVY, *Primary Examiner.*